Feb. 14, 1967   W. S. LORENZ   3,304,496
PHASE ANGLE INDICATING MEANS
Filed June 1, 1964

Inventor
Willard S. Lorenz
By R J Falkowski
Attorney

United States Patent Office 3,304,496
Patented Feb. 14, 1967

3,304,496
PHASE ANGLE INDICATING MEANS
Willard S. Lorenz, Oconomowoc, Wis., assignor to Allis-Chalmers Manufacturing Company, Milwaukee, Wis.
Filed June 1, 1964, Ser. No. 371,480
7 Claims. (Cl. 324—87)

This invention relates to means for indicating the phase angle between two alternating electrical sources and particularly relates to phase angle indicating means that indicate the phase angle and the leading or lagging relationship between the two sources.

Phase angle indicating means can be used for several purposes including indication of the power factor of a single phase source by comparing the voltage and current phase relationships, synchronization when paralleling two sources, and applications where phase angle relationships are necessary to operate subsequent control systems. When measuring power factor a phase angle indicating means according to this invention can be used to indicate whether the voltage or current is leading so that appropriate corrections can be made in the power circuit.

With this invention it is possible to produce an output that varies as a function of the phase angle between two inputs and also indicates which of the two inputs is leading.

The objects of this invention are: to provide a new and improved phase angle indicating means; to provide a phase angle indicating means that continuously indicates the phase angle between two alternating inputs and also indicates which of the inputs is leading; to provide a phase angle indicating means that produces a continuous level that varies as a function of the phase angle relationship between two sources and a polarity that indicates which of the two sources is leading; to provide a phase angle indicating means that directly senses the phases of the inputs without requiring a phase shift of a predetermined angle of either input; and to provide a phase angle indicating means that is operable with inputs of any frequency without requiring special frequency compensation.

Other objects and advantages will appear from the following detailed description of the invention.

Figure 1:
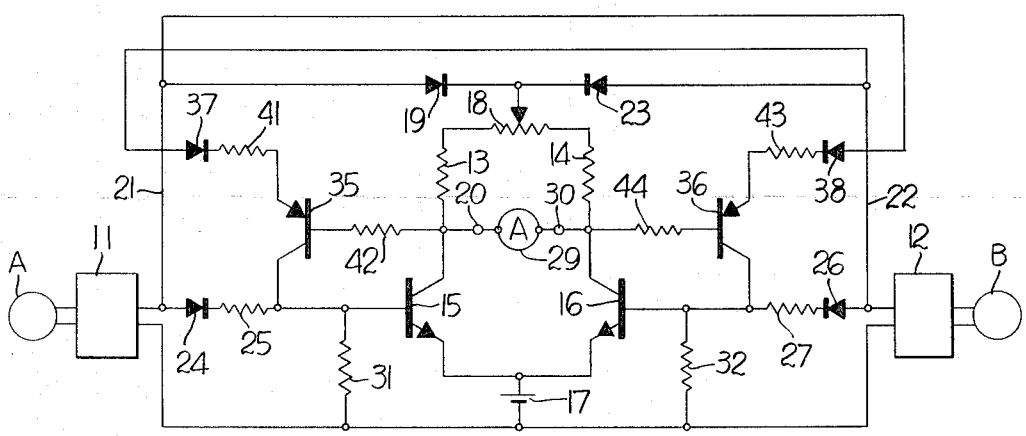
FIG. 1 is a schematic drawing of an embodiment of this invention.

Referring to FIG. 1, two sources, A and B, provide a first and second alternating source. Source A is connected to a squaring amplifier 11 and source B is connected to a squaring amplifier 12. The squaring amplifiers produce a square wave output in response to the alternating inputs as illustrated by the upper two wave forms of columns $b$ and $d$ in FIG. 3.

In the embodiment shown in FIG. 1, the squaring amplifiers also provide power for a bridge circuit. Squaring amplifier 11 provides power along a conductor 21 through a diode 19 to the bridge circuit and squaring amplifier 12 provides power along conductor 22 through a diode 23 to the bridge circuit.

The bridge circuit comprises a first leg and a second leg parallel to the first leg. The first leg comprises a resistor 13 and a switching means that may comprise a transistor 15. The second leg comprises resistor 14 and a switching means that may comprise a transistor 16. A means for biasing transistors 15 and 16 such as a battery 17 is provided. A potentiometer 18 provides for adjustment to balance the legs of the bridge. Two output terminals 20 and 30 provide an output circuit that is connected to a load, such as an ammeter 29.

While the embodiment of FIG. 1 shows transistors as switching means there are other devices such as silicon controlled rectifiers that can be utilized to perform similar functions. Also it is apparent that either PNP or NPN transistors may be used.

A diode is provided to pass only positive pulses and a base current resistor 25 is provided to limit current flow to the base of transistor 15. A diode 26 and a base current limiting resistor 27 are furnished for the same purposes relative to transistor 16. Input resistors 31 and 32 are connected across the base-emitter circuits of transistors 15 and 16, respectively.

Latching means are provided for controlling switching transistors 15 and 16. The latching means comprise a pair of transistors 35 and 36, diodes 37 and 38, current limiting resistors 41 and 42, and current limiting resistors 43 and 44. Transistor 35 controls switching transistor 15 and transistor 36 controls switching transistor 16.

In the operation of the circuit shown in FIG. 1, the alternating current inputs from sources A and B are squared by squaring amplifiers 11 and 12, respectively. The square wave outputs produced by the squaring amplifiers provide a sharp indication of the beginning and the end of the respective half cycles of the inputs that are used to operate the circuit. In this embodiment the positive half cycle is used to produce a positive square wave with its leading edge corresponding to the beginning of each positive half cycle and the trailing edge corresponding to the end of each positive half cycle.

When the output of squaring amplifier 11 is positive, transistor 15 is turned on. Similarly, when the output of squaring amplifier 12 is positive, transistor 16 is turned on.

Figure 3:
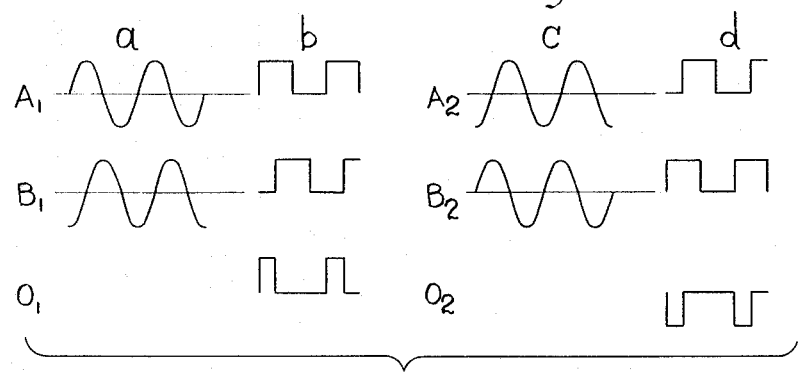
FIG. 3 is a drawing of typical wave forms appearing in the embodiment shown in FIG. 1.

The wave forms appearing in the circuit are illustrated in FIG. 3. For example, one situation that may occur is having input A leading input B. This is shown as wave forms $A_1$ and $B_1$ in column $a$. The squaring amplifiers produce positive pulses corresponding to the positive half cycles of the inputs as shown in column $b$.

When the positive square pulse turns on transistor 15 in response to the pulse of $A_1$, before transistor 16 turns on in response to the pulse of $B_1$, current flows from the power source, squaring amplifier 11, through conductor 21, through diode 19, through potentiometer 18, through parallelly connected resistors 13 and 14, through the ammeter connected across output terminals 20 and 30, through switching transistor 15, and through biasing battery 17 back to the power source. With transistor 15 turned on before transistor 16, output terminal 30 is positive relative to output terminal 20 and electron, or negative, current flows through the load across the output terminals in a direction from terminal 20 to 30. This is illustrated in FIG. 3, column $b$, by the pulse appearing in wave form $0_1$.

Current flows through the load until transistor 16 is turned on by the positive pulse from squaring amplifier 12. When transistor 16 turns on, terminals 20 and 30 are connected to each other and are at the same potential and no current flows across the load, as illustrated by the return to zero of the pulse appearing in waveform $0_1$.

The positive pulse from squaring amplifier 11 is also applied to the emitter of transistor 36 and the positive pulse from squaring amplifier 12 is also applied to the emitter of transistor 35. Transistors 35 and 36 function as latching means to keep transistors 15 and 16, respectively, turned on until neither input is positive. With the conditions of inputs $A_1$ and $B_1$ as shown in FIG. 3, columns $a$ and $b$, transistor 15 turns on first and would be expected to turn off first. However, transistor 16 turns on before the end of the positive pulse from source A. When transistor 16 turns on, transistor 35 also turns on (if transistor 15 is already turned on as in this example) and applies the positive pulse from squaring amplifier 12 through the emitter-collector circuit of transistor 35 to the base of transistor 15 and keeps transistor 15 turned on.

The latching means for each switching transistor does not turn its associated switching transistor on but only keeps it on if it is already turned on until both source A and B are no longer positive. For example, when transistor 15 turns on, transistor 36 does not turn on until transistor 16 turns on to connect the base of transistor 36 to the negative conductor through the emitter-collector circuit of transistor 16. In this example, since transistor 15 is turned on when transistor 16 turns on, transistor 35 turns on with transistor 16 and keeps transistor 15 turned on until transistor 16 turns off. Once both switching transistors are turned on they both stay on until both inputs A and B are no longer positive.

When both transistors 15 and 16 are turned off, the potential across terminals 20 and 30 is still zero, and no current flows across the load until transistor 15 again turns on, as illustrated by waveform $\theta_1$.

If source B leads source A, illustrated in FIG. 3 as waveforms $A_2$ and $B_2$ in column $c$, the current flowing through the load is of an opposite polarity, as illustarted by the pulses appearing in waveform $\theta_2$, column $d$. This occurs because transistor 16 turns on first and negative current flows across terminals 20 and 30 from terminals 30 to 20. This is the opposite direction to the current flow caused by exemplary inputs $A_1$ and $B_1$. Thus an ammeter that is utilized as a load deflects in a given direction depending on which input is leading. The amount of deflection is a function of the width of the pulses ($\theta_1$ and $\theta_2$). Since the width of the pulses varies as a function of the phase angle, the output circuit current indicates the phase angle.

Figure 2:
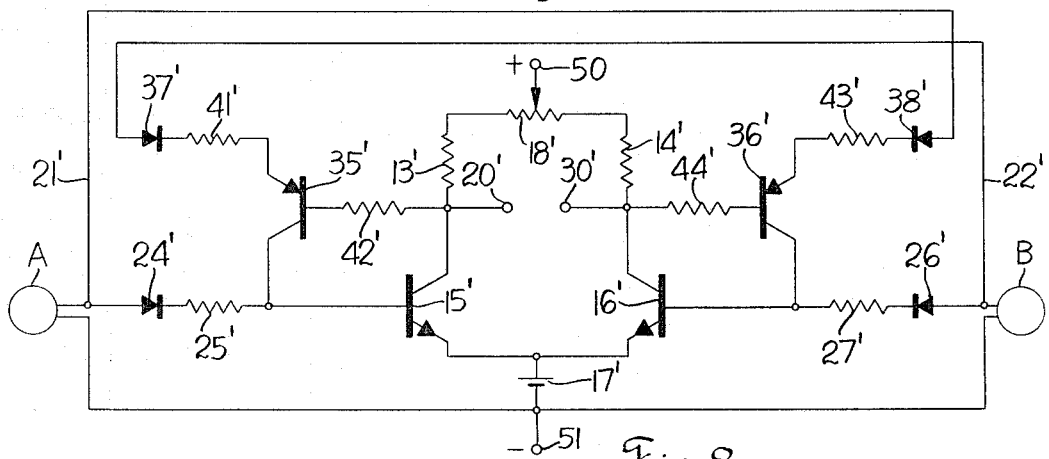
FIG. 2 is a schematic drawing of another embodiment of this invention.

In a circuit as shown in FIG. 2 (similar reference numbers are used in FIGS. 1 and 2), a squaring amplifier is not used. An auxiliary power source at terminals 50 and 51 provides power for the bridge circuit. Source A and source B are rectified by diodes 24' and 26', respectively, and the resultant half wave signals are applied directly to the bases of the switching transistors 15' and 16', respectively, to turn them on to function in the same manner as described with FIG. 1.

It is possible to design the circuit for any degree of desired accuracy by using circuitry refinements known in the art. The circuit shown in FIG. 1 is more accurate than the circuit shown in FIG. 2 because the squared pulses more definitely affect the switching transistors to indicate the change to positive polarity.

In describing the invention, the preferred embodiment has been shown and described, but it is obvious to one skilled in the art that there are many variations, combinations, alterations and modifications that may be made without departing from the spirit of the invention or from the scope of the appended claims.

The embodiments of the invention in which an exclusive property or privilege is claimed are defined as follows:

1. Means for producing an output varying as a function of the phase angle between a first and second cyclic electrical input, said means comprising:
    a bridge circuit having a first and second switching means and an output circuit;
    an electrical energy source connected to energize the bridge circuit;
    said first switching means connected to be responsive to the first input for completing an electrical circuit through the bridge circuit when turned on, and connected to be responsive to turn on during half cycles of one polarity of the first input;
    second switching means connected to be responsive to the second input for completing an electrical circuit through the bridge circuit when turned on, and connected to be responsie to turn on during half cycles of one polarity of the second input;
    lathching means responsive to the first and second inputs for keeping the first and second switching means turned on until after completion of the half cycles of one polarity of the first and second inputs;
    said output circuit connected to the first and second switching means to conduct current in one direction when the first switching means turns on before the second switching means and to conduct current in an opopsite direction when the second switching means turns on before the first switching means; and
    said output circuit connected across zero potential when both switching means are turned on.

2. Means for producing an output varying as a function of the phase angle between a first and second cyclic electrical input, said means comprising:
    a bridge circuit having a first leg comprising a first resistance and a first switching means connected in series and a second leg connected parallel to the first leg comprising a second resistance and a second switching means connected in series;
    an output circuit connected across the two legs between each resistance and switching means;
    an electrical energy source connected to energize the bridge circuit;
    said first switching means connected to be responsive to the first input to turn on during half cycles of one polarity of the first input;
    said second switching means connected to be responsive to the second input to turn on during half cycles of one polarity of the second input; and
    latching means responsive to the first and second inputs for keeping the first and second switching means turned on until completion of the half cycles of one polarity of the first and second inputs.

3. Means for producing a voltage across a load, said voltage having a level varying as a function of the phase angle between a first and second alternating input and having a polarity indicating which of the inputs is leading, said means comprising:
    a first and second resistance each having a first and second end terminal and each having its first end terminal connected to an electrical power source;
    said load connected between the second end terminals of the first and second resistance;
    first switching means operable when turned on to connect the second terminal of the first resistor to conduct current from the electrical power source through the first and second resistance and the load, said first switching means connected to be responsive to the first input to turn on during half cycles of one polarity of the first input;
    second switching means operable when turned on to connect the second terminal of the second resistor to conduct current from the electrical power source through the first and second resistance and the load, said second switching means connected to be responsive to the second input to be turned on during half cycles of one polarity of the second input; and
    means responsive to half cycles of the one polarity of both the first and second input for keeping the first and second switching means turned on as long as one input is in a half cycle of said one polarity.

4. Means for producing an output across a first and second output terminal indicating the phase angle between first and second alternating electrical inputs comprising:
    an electrical power source having a first and second output terminal;
    a first and second resistance each having two end terminals and each having one end terminal connected to the first terminal of the electrical power source;

a load connected across the other end terminals of the first and second resistance;

first switching means operable when turned on to connect the other terminal of the first resistor to the second terminal of the electrical power source, said first switching means connected to be responsive to the first input to be turned on during the positive portions of the first input;

second switching means operable when turned on to connect the other terminal of the second resistor to the second terminal of the electrical power source, said second switching means connected to be responsive to the second input to be turned on during the positive portions of the second input; and means responsive to the turning on of the first and second switching means for keeping the first and second switching means turned on when one input is in a positive portion of its cycle.

5. Means for producing an output across a first and second output terminal indicating the phase angle between a first and second alternating electrical source comprising:

a power source having a first and second terminal;

a first and second resistance each having two end terminals and each having one end terminal connected to the first terminal of the power source;

first semiconductor switching means operable when turned on to connect the second terminal of the power source to the other terminal of the first resistor, said first switching means connected to be responsive to the first source to be turned on during the positive half cycle portions of the first source;

second semiconductor switching means operable when turned on to connect the second terminal of the power source to the other terminal of the second resistor, said second switching means connected to be responsive to the second source to be turned on during the positive half cycle portions of the second source;

semiconductor means responsive to the turning on of the first and second switching means and responsive to the positive half cycle portions of the first and second source for keeping the first and second switching means turned on as long as one of the alternating sources is in a positive portion of its half cycle; and a first output terminal connected to the second terminal of the first resistor and a second output terminal connected to the second terminal of the second resistor.

6. Means for producing an output across a first and second output terminal varying as a function of the phase angle between a first and second alternating electrical source and having a polarity indicating which is the leading source, said means comprising:

a first squaring amplifier means having a first and second output terminal for producing a first positive square wave pulse during the interval the first source is positive;

a second squaring amplifier means having a first and second output terminal for producing a second positive square wave pulse during the interval the second source is positive;

a first and second resistance each having two end terminals and each having one end terminal connected to the first output terminals of the first and second squaring amplifiers;

first semiconductor switching means operable when turned on to connect the second output terminal of the first squaring amplifier to the other terminal of the first resistor, said first switching means connected to be turned on in response to the first square wave pulse;

second switching means operable when turned on to connect the second output terminal of the second squaring amplifier to the other terminal of the second resistor, said second switching means connected to be turned on in response to the second square wave pulse;

means responsive to the turning on of the switching means for keeping the first and second switching means turned on when one of the squaring amplifier outputs is positive; and a first output terminal connected to the second terminal of the first resistor and a second output terminal connected to the second terminal of the second resistor.

7. Means for producing an output across a first and second output terminal varying as a function of the phase angle between a first and second alternating electrical source and having a polarity indicating which is the leading source, said means comprising:

a first squaring amplifier means having a first and second output terminal for producing a first positive square wave pulse during the interval the first source is positive;

a second squaring amplifier means having a first and second output terminal for producing a second positive square wave pulse during the interval the second source is positive;

a first and second resistance each having two end terminals and each having one end terminal connected to the first output terminals of the first and second squaring amplifiers;

a first switching transistor for connecting the second output terminal of the first squaring amplifier to the other terminal of the first resistor in response to the first square wave pulse;

a second switching transistor for connecting the second output terminal of the second squaring amplifier to the other terminal of the second resistor in response to the second square wave pulse;

a third switching transistor responsive to the second square wave pulse for keeping the first switching transistor turned on during the interval of the second square wave pulse;

a fourth switching transistor responsive to the first square wave pulse for keeping the second switching transistor turned on during the interval of the first square wave pulse; and a first output terminal connected to the second terminal of the first resistor and a second output terminal connected to the second terminal of the second resistor.

References Cited by the Examiner

UNITED STATES PATENTS

| 2,370,692 | 3/1945 | Shepherd | 324—89 X |
| 2,953,722 | 9/1960 | Willis | 324—83 X |
| 2,957,137 | 10/1960 | Robinson | 324—89 X |
| 3,191,121 | 6/1965 | Nelson | 324—79 |

FOREIGN PATENTS 871,942  7/1961  Great Britain.

OTHER REFERENCES

I.B.M. Technical Disclosure Bulletin, vol. 3, No. 8, p. 37, January 1961.

WALTER L. CARLSON, *Primary Examiner.*

P. F. WILLE, *Assistant Examiner.*